(12) United States Patent　(10) Patent No.: US 8,279,580 B2
Zhong et al.　(45) Date of Patent: Oct. 2, 2012

(54) ELECTRODE FOR ENERGY STORAGE DEVICE WITH MICROPOROUS AND MESOPOROUS ACTIVATED CARBON PARTICLES

(75) Inventors: Linda Zhong, San Diego, CA (US); Xiaomei Xi, Carlsbad, CA (US)

(73) Assignee: Maxwell Technologies, Inc., San Diego, CA (US)

( * ) Notice: Subject to any disclaimer, the term of this patent is extended or adjusted under 35 U.S.C. 154(b) by 497 days.

(21) Appl. No.: 12/445,295

(22) PCT Filed: Oct. 17, 2007

(86) PCT No.: PCT/US2007/081698
§ 371 (c)(1),
(2), (4) Date: Apr. 15, 2009

(87) PCT Pub. No.: WO2008/049037
PCT Pub. Date: Apr. 24, 2008

(65) Prior Publication Data
US 2010/0033898 A1　Feb. 11, 2010

Related U.S. Application Data

(60) Provisional application No. 60/852,459, filed on Oct. 17, 2006.

(51) Int. Cl.
*H01G 4/005* (2006.01)
(52) U.S. Cl. ............ 361/502; 361/303; 361/301.1; 361/523; 361/508
(58) Field of Classification Search .......... 361/303, 361/301.1, 523, 516, 508, 502
See application file for complete search history.

(56) References Cited

U.S. PATENT DOCUMENTS

| | | | |
|---|---|---|---|
| 5,973,912 A | 10/1999 | Kibi | |
| 6,127,474 A | 10/2000 | Andelman | |
| 6,296,746 B1 | 10/2001 | Broman | |
| 6,359,769 B1 | 3/2002 | Mushiake | |
| 6,377,441 B1 | 4/2002 | Ohya | |
| 6,426,865 B2 | 7/2002 | Kasahara | |
| 6,456,484 B1 | 9/2002 | Matsuoka | |
| 6,461,769 B1 | 10/2002 | Ando et al. | |

(Continued)

FOREIGN PATENT DOCUMENTS

JP　1992-148670　12/1993

(Continued)

OTHER PUBLICATIONS

Office Action dated Sep. 1, 2010 Received from Chinese Patent Office for co-pending Chinese Application No. 200780038879.7.

(Continued)

*Primary Examiner* — Nguyen T Ha
*Assistant Examiner* — Hung Dang
(74) *Attorney, Agent, or Firm* — Knobbe Martens Olson & Bear LLP

(57) ABSTRACT

Particles of active electrode material are made by blending or mixing a mixture of activated carbon, optional conductive carbon, and binder. In selected implementations, the activated carbon particles have between about 70 and 98 percent microporous activated carbon particles and between about 2 and 30 percent mesoporous activated carbon particles by weight. Optionally, a small amount of conductive particles, such as conductive carbon particles may be used. In one implementation, the binder is inert. The electrode material may be attached to a current collector to obtain an electrode for use in various energy storage devices, including a double layer capacitor.

27 Claims, 2 Drawing Sheets

U.S. PATENT DOCUMENTS

| | | |
|---|---|---|
| 6,500,770 B1 | 12/2002 | Cheng |
| 6,532,144 B2 | 3/2003 | Ohya |
| 6,565,701 B1 | 5/2003 | Jerabek |
| 6,627,252 B1 | 9/2003 | Nanjundiah |
| 6,631,073 B1 | 10/2003 | Sakata et al. |
| 6,631,074 B2 | 10/2003 | Bendale |
| 6,740,454 B1 | 5/2004 | Ando et al. |
| 6,862,168 B2 | 3/2005 | Ando et al. |
| 7,147,674 B1 | 12/2006 | Zhong |
| 7,317,609 B2 | 1/2008 | Zhong |
| 7,443,651 B2 | 10/2008 | Ando et al. |
| 7,697,264 B2 | 4/2010 | Tasaki et al. |
| 7,733,629 B2 | 6/2010 | Tasaki et al. |
| 7,768,769 B2 | 8/2010 | Matsui et al. |
| 2003/0161781 A1* | 8/2003 | Cabasso et al. ............ 423/445 R |
| 2005/0014643 A1 | 1/2005 | Lini |
| 2005/0057888 A1 | 3/2005 | Mitchell |
| 2006/0057433 A1 | 3/2006 | Ando et al. |
| 2006/0115723 A1 | 6/2006 | Ando et al. |
| 2006/0188784 A1 | 8/2006 | Sudoh |
| 2008/0106850 A1 | 5/2008 | Zhong |
| 2009/0023066 A1 | 1/2009 | Kojima et al. |

FOREIGN PATENT DOCUMENTS

| | | |
|---|---|---|
| JP | 1992-359777 | 7/1994 |
| JP | 2001-044082 | 2/2001 |
| JP | 2001-143973 | 5/2001 |
| JP | 2003-054524 | 2/2003 |
| JP | 2003-341526 | 12/2003 |
| JP | 2005-379763 | 3/2005 |
| JP | 2005-104676 | 4/2005 |
| JP | 2005-104701 | 4/2005 |
| JP | 2005-104709 | 4/2005 |
| JP | 2005-104735 | 4/2005 |
| JP | 2005-121571 | 5/2005 |
| JP | 2005-125707 | 5/2005 |
| JP | 2005-128714 | 5/2005 |
| JP | 2005-160529 | 6/2005 |
| JP | 2005-196723 | 7/2005 |
| JP | 2005-249763 | 9/2005 |
| JP | 2005-249927 | 9/2005 |
| JP | 2005-250022 | 9/2005 |
| JP | 2005-251586 | 9/2005 |
| JP | 2005-286170 | 10/2005 |
| JP | 2005-302342 | 10/2005 |
| JP | 2005-329455 | 12/2005 |
| JP | 2005-355409 | 6/2007 |
| JP | 2005-379698 | 7/2007 |
| JP | 2005-379741 | 7/2007 |
| JP | 2005-379798 | 7/2007 |

OTHER PUBLICATIONS

International search report for international application No. PCT/US07/81698.

Written opinion for international application No. PCT/US07/81698.

Office Action dated May 29, 2012, in counterpart Jap. App. No. 2009-533513, filed Oct. 17, 2007.

* cited by examiner

ELECTRODE FOR ENERGY STORAGE DEVICE WITH MICROPOROUS AND MESOPOROUS ACTIVATED CARBON PARTICLES

CROSS-REFERENCE TO RELATED APPLICATIONS

This application claims the benefit of U.S. provisional application No. 60/852,459, filed by Linda Zhong and Xiaomei Xi on 17 Oct. 2006, which is hereby incorporated by reference as though fully set forth herein.

BACKGROUND

The present invention generally relates to electrodes and the fabrication of electrodes. More specifically, the present invention relates to electrodes used in energy storage devices, such as electrochemical double layer capacitors and hybrid capacitor and battery devices.

Electrodes are widely used in many devices that store electrical energy, including primary (non-rechargeable) battery cells, secondary (rechargeable) battery cells, fuel cells, and capacitors. Important characteristics of electrical energy storage devices include energy density, power density, maximum charging and discharging rate, internal leakage current, equivalent series resistance (ESR), and/or durability, i.e., the ability to withstand multiple charge-discharge cycles. For a number of reasons, double layer capacitors, also known as supercapacitors and ultracapacitors, are gaining popularity in many energy storage applications. The reasons include availability of double layer capacitors with high power densities (in both charge and discharge modes), and the long life of double layer capacitors compared to conventional rechargeable cells.

Double layer capacitors typically use as their energy storage element electrodes immersed in an electrolyte (an electrolytic solution). As such, a porous separator immersed in and impregnated with the electrolyte may ensure that the electrodes do not come in contact with each other, preventing electronic current flow directly between the electrodes. At the same time, the porous separator allows ionic currents to flow through the electrolyte between the electrodes in both directions. As discussed below, double layers of charges are formed at the interfaces between the solid electrodes and the electrolyte.

When electric potential is applied between a pair of electrodes of a double layer capacitor, ions that exist within the electrolyte are attracted to the surfaces of the oppositely-charged electrodes, and migrate towards the electrodes. A layer of oppositely-charged ions is thus created and maintained near each electrode surface. Electrical energy is stored in the charge separation layers between these ionic layers and the charge layers of the corresponding electrode surfaces. In fact, the charge separation layers behave essentially as electrostatic capacitors. Electrostatic energy can also be stored in the double layer capacitors through orientation and alignment of molecules of the electrolytic solution under influence of the electric field induced by the potential. This mode of energy storage, however, is secondary.

In comparison to conventional capacitors, double layer capacitors have high capacitance in relation to their volume and weight. There are two main reasons for these volumetric and weight efficiencies. First, the charge separation layers are very narrow. Their widths are typically on the order of nanometers. Second, the electrodes can be made from a porous material, having very large effective surface area per unit volume. Because capacitance is directly proportional to the electrode area and inversely proportional to the widths of the charge separation layers, the combined effect of the large effective surface area and narrow charge separation layers is capacitance that is very high in comparison to that of conventional capacitors of similar size and weight. High capacitance of double layer capacitors allows the capacitors to receive, store, and release large amount of electrical energy.

Electrical energy stored in a capacitor is determined using a well-known formula:

$$E = \frac{C * V^2}{2}. \quad (1)$$

In this formula, E represents the stored energy, C stands for the capacitance, and V is the voltage of the charged capacitor. Thus, the maximum energy ($E_m$) that can be stored in a capacitor is given by the following expression:

$$E_m = \frac{C * V_r^2}{2}, \quad (2)$$

where $V_r$ stands for the rated voltage of the capacitor. It follows that a capacitor's energy storage capability depends on both (1) its capacitance, and (2) its rated voltage. Increasing these two parameters may therefore be important to capacitor performance.

SUMMARY

Over a number of charge-discharge cycles, ions within an electrolyte of an energy storage device may migrate within an electrode of the energy storage device. Over time, ions may get "stuck" within pores (e.g., micropores) of an electrode and become unavailable for further charge-discharge cycles. This reduction in available ions within a localized region of the electrode results in a condition of "local electrolyte starving" in that region of the electrode. As regions of an electrode lose the availability of ions in those regions, the energy storage device undergoes a reduction in performance. It would be desirable to improve reliability and durability of energy storage devices, as measured by the number of charge-discharge cycles that an energy storage device can withstand without a significant deterioration in its operating characteristics. Additionally, it would be desirable to provide energy storage devices using these electrodes.

The use of both microporous and mesoporous activated carbons together is provided. The mesoporous activated carbons provide excess capacity for electrolytes (and the ions within the electrolytes). Microporous activated carbons, however, have smaller capacities for electrolytes and ions. Thus, when ions may not be available due to the microporous activated carbons, the mesoporous activated carbons may provide additional electrolyte in a localized region to provide additional ions for charge-discharge cycles.

In a double layer capacitor, for example, local electrolyte starvation can lead to capacitance fade, where the capacitance of the double layer capacitor decreases over multiple charge-discharge cycles. It would be desirable to improve reliability and durability of energy storage devices double layer capacitors, as measured by the number of charge-discharge cycles that a double layer capacitor can withstand without a significant deterioration in its operating characteristics (e.g., capacitance). Since an end of life of a double layer capacitor can be defined for a particular application by reaching an unacceptable capacitance level for that application, slowing a fade in capacitance can directly increase the life of a double layer capacitor.

Various implementations hereof are directed to methods, electrodes, electrode assemblies, and electrical devices that may be directed to or may satisfy one or more of the above needs. An exemplar implementation herein disclosed is a method of making particles of active electrode material. In accordance with such a method, particles of activated carbon, optional conductive carbon, and binder may be mixed. In aspects hereof, the activated carbon may comprise between about 70 and 98 percent microporous activated carbon particles and between about 2 and 30 percent mesoporous activated carbon particles by weight. In aspects hereof, the optional conductive particles may include conductive carbon materials such as carbon black, graphite, carbon fiber, carbon nanotubes, and the like.

In accordance with some alternative aspects hereof, the binder is an electrochemically inert binder, such as PTFE. The proportion of the inert binder may be between about 3 and about 20 percent by weight, and in some other instances between about 9 and about 11 percent by weight, or may be, for example, about 10 percent by weight. In accordance with some aspects hereof, the proportion of the optional conductive particles in the resultant mixture may be between about 0 and about 15 percent by weight, and in some instances does not exceed about 0.5 percent by weight. In accordance with further alternative aspects hereof, mixing of the activated carbon, optional conductive carbon, and binder may be performed by dry-blending these ingredients. In accordance with some further alternative aspects hereof, the mixing may be carried out by subjecting the activated carbon, optional conductive carbon, and binder to a non-lubricated high-shear force technique. In accordance with still further alternative aspects hereof, films of active electrode material may be made from the particles of active electrode material made as is described herein. The films may be attached to current collectors and used in various electrical devices, for example, in double layer capacitors. Other binders that may be used include, but are not limited to, polyvinylidene difluoride (PVDF), polyethylene (PE), high molecular weight polyethylene (HMWPE), ultra high molecular weight polyethylene (UHMWPE), polypropylene (PP), carboxymethyl cellulose (CMC), polyvinylphenol, polyvinylpyrrolidine, polyvinyl acetate, polyvinyl alcohol, and polyacetylene.

In one implementation, a method of making particles of active electrode material may include providing activated carbon with between about 70 and 98 percent microporous activated carbon particles and between about 2 and 30 percent mesoporous activated carbon particles by weight; providing binder; mixing the activated carbon and the binder to obtain a mixture. The method may in some options further include providing conductive particles, such as conductive carbon particles. In one implementation, the binder may be or may include PTFE. In one implementation, the operation of mixing may include dry blending the activated carbon, conductive carbon, and the binder. In one implementation, the operation of mixing may be performed without processing additives. In another implementation, the operation of mixing may be performed with one or more processing additives.

In one implementation, an electrode may include a current collector; and a film of active electrode material attached to the current collector, wherein the active electrode material may include particles of activated carbon with between about 70 and 98 percent microporous activated carbon particles and between about 2 and 30 percent mesoporous activated carbon particles by weight. The active electrode material further includes binder. The active electrode material may also include conductive particles, such as conductive carbon particles. In one implementation, the activated carbon may have between about 80 and 98 percent microporous activated carbon particles and between about 2 and 20 percent mesoporous activated carbon particles by weight. In another implementation, the activated carbon may have between about 85 and 95 percent microporous activated carbon particles and between about 5 and 15 percent mesoporous activated carbon particles by weight.

In one implementation, an electrochemical double layer capacitor may include a first electrode comprising a first current collector and a first film of active electrode material, the first film comprising a first surface and a second surface, the first current collector being attached to the first surface of the first film; a second electrode comprising a second current collector and a second film of active electrode material, the second film comprising a third surface and a fourth surface, the second current collector being attached to the third surface of the second film; a porous separator disposed between the second surface of the first film and the fourth surface of the second film; a container; an electrolyte; wherein: the first electrode, the second electrode, the porous separator, and the electrolyte are disposed in the container; the first film is at least partially immersed in the electrolyte; the second film is at least partially immersed in the electrolyte; the porous separator is at least partially immersed in the electrolyte; each of the first and second films may include a mixture comprising activated carbon, wherein the activated carbon has between about 70 and 98 percent microporous activated carbon particles and between about 2 and 30 percent mesoporous activated carbon particles by weight. In one implementation, the electrode films further may include conductive particles, such as conductive carbon. In one implementation, the electrode films further may include binder. In one implementation, the films are attached to respective collectors via a conductive adhesive layer.

These and other features and aspects of the present invention will be better understood with reference to the following description, drawings, and appended claims.

BRIEF DESCRIPTION OF THE DRAWINGS

FIG. 2, which includes sub-part

DETAILED DESCRIPTION

Figure 1:
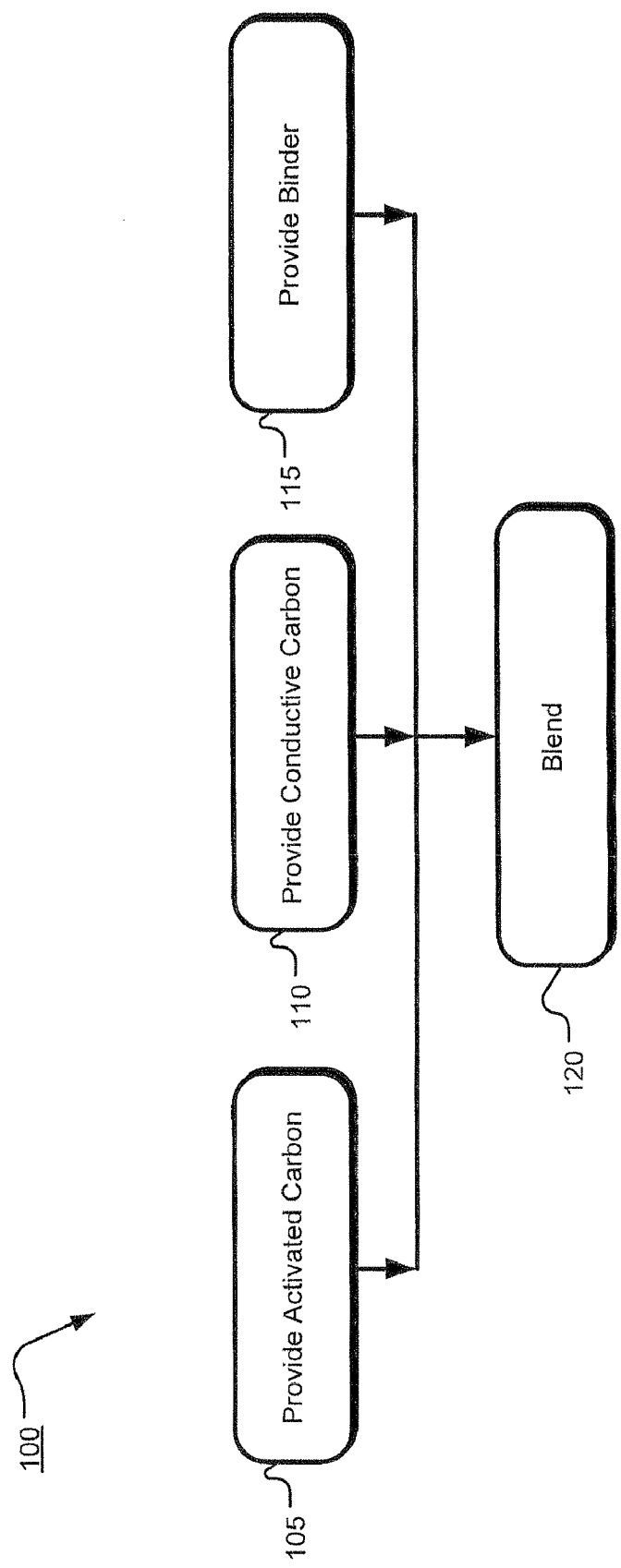
FIG. 1 illustrates selected operations of a process for making active electrode material in accordance with some aspects hereof.

In this document, the words "implementation" and "variant" may be used to refer to a particular apparatus, process, or article of manufacture, and not necessarily always to one and the same apparatus, process, or article of manufacture. Thus, "one implementation" (or a similar expression) used in one place or context can refer to one particular apparatus, process, or article of manufacture; and, the same or a similar expression in a different place can refer either to the same or to a different apparatus, process, or article of manufacture. Similarly, "some implementations," "certain implementations," or similar expressions used in one place or context may refer to one or more particular apparatuses, processes, or articles of manufacture; the same or similar expressions in a different place or context may refer to the same or a different apparatus, process, or article of manufacture. The expression "alternative implementation" and similar phrases are used to indicate one of a number of different possible implementations. The number of possible implementations is not necessarily limited to two or any other quantity. Characterization of an implementation as "an exemplar" or "exemplary" means that the implementation is used as an example. Such characterization does not necessarily mean that the implementation is a preferred implementation; the implementation may but need not be a currently preferred implementation.

The expression "active electrode material" and similar phrases signify material that provides or enhances the function of the electrode beyond simply providing a contact or reactive area approximately the size of the visible external surface of the electrode. In a double layer capacitor electrode, for example, a film of active electrode material includes particles with high porosity, so that the surface area of the electrode exposed to an electrolyte in which the electrode is immersed may be increased well beyond the area of the visible external surface; in effect, the surface area exposed to the electrolyte becomes a function of the volume of the film made from the active electrode material.

The meaning of the word "film" is similar to the meaning of the words "layer" and "sheet"; the word "film" does not necessarily imply a particular thickness or thinness of the material. When used to describe making of active electrode material film, the terms "powder," "particles," and the like refer to a plurality of small granules. As a person skilled in the art would recognize, particulate material is often referred to as a powder, grain, specks, dust, or by other appellations. References to carbon and binder powders throughout this document are thus not meant to limit the present implementations.

The references to "binder" within this document are intended to convey the meaning of polymers, co-polymers, and similar ultra-high molecular weight substances capable of providing a binding for the carbon herein. Such substances are often employed as binder for promoting cohesion in loosely-assembled particulate materials, i.e., active filler materials that perform some useful function in a particular application.

The words "calender," "nip," "laminator," and similar expressions mean a device adapted for pressing and compressing. Pressing may be, but is not necessarily, performed using rollers. When used as verbs, "calender" and "laminate" mean processing in a press, which may, but need not, include rollers. Mixing or blending as used herein may mean processing which involves bringing together component elements into a mixture. High shear or high impact forces may be, but are not necessarily, used for such mixing. Example equipment that can be used to prepare/mix the dry powder(s) hereof may include, in non-limiting fashion: a ball mill, an electromagnetic ball mill, a disk mill, a pin mill, a high-energy impact mill, a fluid energy impact mill, an opposing nozzle jet mill, a fluidized bed jet mill, a hammer mill, a fritz mill, a Warring blender, a roll mill, a mechanofusion processor (e.g., a Hosokawa AMS), or an impact mill.

Other and further definitions and clarifications of definitions may be found throughout this document. The definitions are intended to assist in understanding this disclosure and the appended claims, but the scope and spirit of the invention should not be construed as strictly limited to the definitions, or to the particular examples described in this specification.

Reference will now be made in detail to several implementations of the invention that are illustrated in the accompanying drawings. The same reference numerals are used in the drawings and the description to refer to the same or substantially the same parts or operations. The drawings are in simplified form and not to precise scale. For purposes of convenience and clarity only, directional terms, such as top, bottom, left, right, up, down, over, above, below, beneath, rear, and front may be used with respect to the accompanying drawings. These and similar directional terms, should not be construed to limit the scope of the invention.

Referring more particularly to the drawings, FIG. 1 illustrates selected operations of a dry process 100 for making active electrode material. Although the process operations are described substantially serially, certain operations may also be performed in alternative order, in conjunction or in parallel, in a pipelined manner, or otherwise. There is no particular requirement that the operations be performed in the same order in which this description lists them, except where explicitly so indicated, otherwise made clear from the context, or inherently required. Not all illustrated operations may be strictly necessary, while other optional operations may be added to the process 100. A high level overview of the process 100 is provided immediately below. A more detailed description of the operations of the process 100 and variants of the operations are provided following the overview.

In operation 105, activated carbon particles with different porosities may be provided. For the purposes of this application, micropores refer to pores in activated carbon having a pore diameter of less than 2 nanometers, mesopores refer to pores in activated carbon having a pore diameter from 2 nanometers to 50 nanometers, and macropores refer to pores in activated carbon having a pore diameter of greater than 50 nanometers. A bulk activated carbon material may also be classified as microporous activated carbon material, mesoporous activated carbon material, and macroporous activated carbon material. A microporous activated carbon material refers to a bulk activated carbon material having a majority of micropores (i.e., greater than 50 percent of its pores being micropores). A mesoporous activated carbon material refers to a bulk activated carbon material having a majority of mesopores. A macroporous activated carbon material refers to a bulk activated carbon material having a majority of macropores.

In operation 110, optional conductive particles, such as conductive carbon particles with low contamination level and high conductivity or other conductive particles may be provided. In operation 115, binder may be provided. In one or more implementations, and although one or more of a variety of binders may be used as described elsewhere herein, the binder may include polytetrafluoroethylene (also known as PTFE or by the tradename, "Teflon®"). In operation 120, one or more of the activated carbon, conductive carbon, and binder may be blended or mixed; typically two or more may be mixed together. Alternatively, in certain implementations one or more of these ingredients and/or operations may be omitted.

More detailed descriptions of individual operations of the process 100 in preferred and alternative forms are now set forth. As a first example, operation 105, in which activated carbon particles with between about 70 and 98 percent microporous activated carbon particles and between about 2 and 30 percent mesoporous activated carbon particles by weight, is first described. Electrodes made from activated carbon particles with between about 70 and 98 percent microporous activated carbon particles and between about 2 and 30 percent mesoporous activated carbon particles by weight tend to have better mobility of electrolyte in which the electrodes are immersed and ions within the electrolyte to reduce or prevent local electrolyte starvation from occurring, than in the case of activated carbon particles with a higher percentage of microporous activated carbon. Accordingly, in some implementations the activated carbon particles provided in operation 105 have between about 70 and 98 percent microporous activated carbon particles and between about 2 and 30 percent mesoporous activated carbon particles by weight. In some more specific implementations, activated carbon particles provided in the operation 105 have between about 80 and 98 percent microporous activated carbon particles and between about 2 and 20 percent mesoporous activated carbon particles by weight of the activated carbon particles may. In another implementation, the activated carbon particles provided in the operation 105 have between about 85 and 95 percent microporous activated carbon particles and between about 5 and 15 percent mesoporous activated carbon particles by weight In operation 115, binders may be provided, for example: PTFE in granular powder form, and/or various fluoropolymer particles, polypropylene, polyethylene, co-polymers, and/or other polymer blends. It has been identified, that the use of inert binders such as PTFE, tends to increase the voltage at which an electrode including such an inert binder may be operated. Such increase occurs in part due to reduced interactions with electrolyte in which the electrode is subsequently immersed. In one implementation, typical diameters of the PTFE particles may be in the five hundred micron range.

In the operation 120, activated carbon particles and binder particles may be blended or otherwise mixed together. In various implementations, proportions of activated carbon (comprising both microporous activated carbon and mesoporous activated carbon as described above) and binder may be as follows: about 80 to about 97 percent by weight of activated carbon, about 3 to about 20 percent by weight of PTFE. Optional conductive carbon could be added in a range of about 0 to about 15 percent by weight. An implementation may contain about 89.5 percent of activated carbon, about 10 percent of PTFE, and about 0.5 percent of conductive carbon. Other ranges are within the scope hereof as well. Note that all percentages are here presented by weight, though other percentages with other bases may be used. Conductive carbon may be preferably held to a low percentage of the mixture because an increased proportion of conductive carbon may tend to lower the breakdown voltage of electrolyte in which an electrode made from the conductive carbon particles is subsequently immersed (alternative electrolyte examples are set forth below).

In an implementation of the process 100, the blending operation 120 may be a "dry-blending" operation, i.e., blending of activated carbon, conductive carbon, and/or binder is performed without the addition of any solvents, liquids, processing aids, or the like to the particle mixture. Dry-blending may be carried out, for example, for about 1 to about 10 minutes in a mill, mixer or blender (such as a V-blender equipped with a high intensity mixing bar, or other alternative equipment as described further below), until a uniform dry mixture is formed. Those skilled in the art will identify, after perusal of this document, that blending time can vary based on batch size, materials, particle size, densities, as well as other properties, and yet remain within the scope hereof.

In another implementation, the blending operation 120 may blend activated carbon, conductive carbon, and/or binder together with the addition of any solvents, liquids processing aids, or the like. Such additives, for example, may be helpful in forming an electrode film depending on the process used to ultimately form the film. Coating or extrusion film processes, for example, may require one or more additives to be blended or otherwise mixed with the other materials.

As introduced above, the blended dry powder material or other blended materials (e.g., including one or more dry or wet additive) may also or alternatively be formed/mixed/blended using other equipment. Such equipment that can be used to prepare/mix the dry powder(s) or other materials hereof may include, for non-limiting examples: blenders of many sorts including rolling blenders and warring blenders, and mills of many sorts including ball mills, electromagnetic ball mills, disk mills, pin mills, high-energy impact mills, fluid energy impact mills, opposing nozzle jet mills, fluidized bed jet mills, hammer mills, fritz mills, roll mills, mechanofusion processing (e.g., a Hosokawa AMS), or impact mills. In an implementation, the dry powder material may be dry mixed using non-lubricated high-shear or high impact force techniques. In an implementation, high-shear or high impact forces may be provided by a mill such as one of those described above. The dry powder material or other blended material may be introduced into the mill, wherein high-velocities and/or high forces could then be directed at or imposed upon the dry powder material to effectuate application of high shear or high impact to the binder within the dry powder material or other blended material. The shear or impact forces that arise during the dry mixing process may physically affect the binder, causing the binder to bind the binder to and/or with other particles within the material.

Moreover, although additives, such as solvents, liquids, and the like, are not necessarily used in some implementations of the manufacture of certain electrode films disclosed herein, a certain amount of impurity, for example, moisture, may be absorbed by the active electrode material from the surrounding environment. Those skilled in the art will understand, after perusal of this document, that the dry particles used with implementations and processes disclosed herein may also, prior to being provided by particle manufacturers as dry particles, have themselves been pre-processed with additives and, thus, contain one or more pre-process residues. For these reasons, one or more of the implementations and processes disclosed herein may utilize a drying operation at some point before a final electrolyte impregnation operation, so as to remove or reduce the aforementioned pre-process residues and impurities. Even after one or more drying operations, trace amounts of moisture, residues and impurities may be present in the active electrode material and an electrode film made therefrom.

It should also be noted that references to dry-blending, dry particles, and other dry materials and processes used in the manufacture of an active electrode material and/or film do not exclude the use of other than dry processes, for example, this may be achieved after drying of particles and films that may have been prepared using a processing aid, liquid, solvent, or the like.

A product obtained through a process like process 100 may be used to make an electrode film. The films may then be bonded to a current collector, such as a foil made from aluminum or another conductor. The current collector can be a continuous metal foil, metal mesh, or nonwoven metal fabric. The metal current collector provides a continuous electrically conductive substrate for the electrode film. The current collector may be pretreated prior to bonding to enhance its adhesion properties. Pretreatment of the current collector may include mechanical roughing, chemical pitting, and/or use of a surface activation treatment, such as corona discharge, active plasma, ultraviolet, laser, or high frequency treatment methods known to a person skilled in the art. In one implementation, the electrode films may be bonded to a current collector via an intermediate layer of conductive adhesive known to those skilled in the art.

In one implementation, a product obtained from process 100 may be mixed with a processing aid to obtain a slurry-like composition used by those skilled in the art to coat an electrode film onto a collector (i.e. a coating process). The slurry may be then deposited on one or both sides of a current collector. After a drying operation, a film or films of active electrode material may be formed on the current collector. The current collector with the films may be calendered one or more times to densify the films and to improve adhesion of the films to the current collector.

In one implementation, a product obtained from process 100 may be mixed with a processing aid to obtain a paste-like material. The paste-like material may be then be extruded, formed into a film, and deposited on one or both sides of a current collector. After a drying operation, a film or films of active electrode material may be formed on the current collector. The current collector with the dried films may be calendered one or more times to densify the films and to improve adhesion of the films to the current collector.

In yet another implementation, in a product obtained through the process 100 the binder particles may include thermoplastic or thermoset particles. A product obtained through the process 100 that includes thermoplastic or thermoset particles may be used to make an electrode film. Such a film may then be bonded to a current collector, such as a foil made from aluminum or another conductor. The films may be bonded to a current collector in a heated calendar apparatus. The current collector may be pretreated prior to bonding to enhance its adhesion properties. Pretreatment of the current collector may include mechanical roughing, chemical pitting, and/or use of a surface activation treatment, such as corona discharge, active plasma, ultraviolet, laser, or high frequency treatment methods known to a person in the art.

Other methods of forming the active electrode material films with or without additives and attaching the films to the current collector may also be used.

Figure 2A:
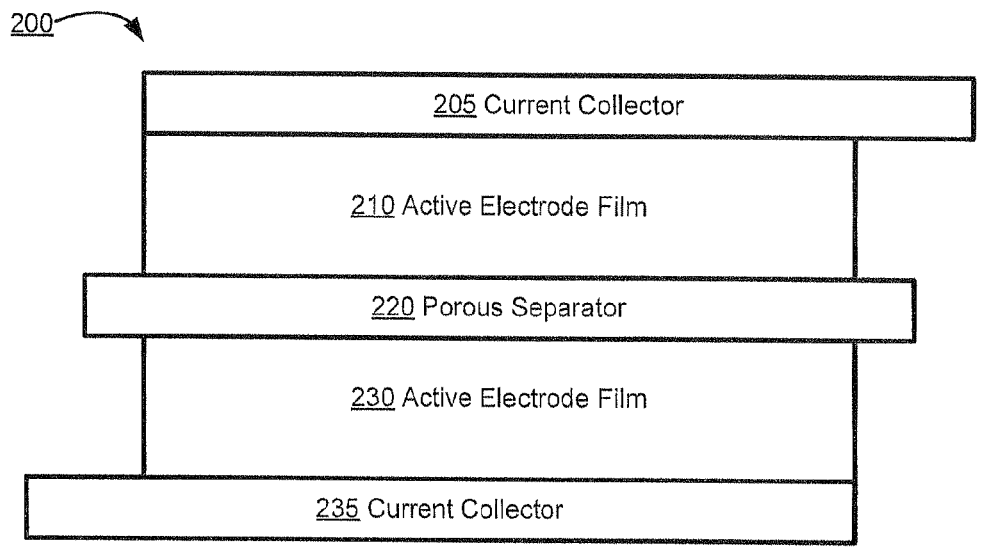
FIGS. 2A and 2B, illustrates a cross-section of respective electrode assemblies which may be used in an ultracapacitor.
Figure 2B:
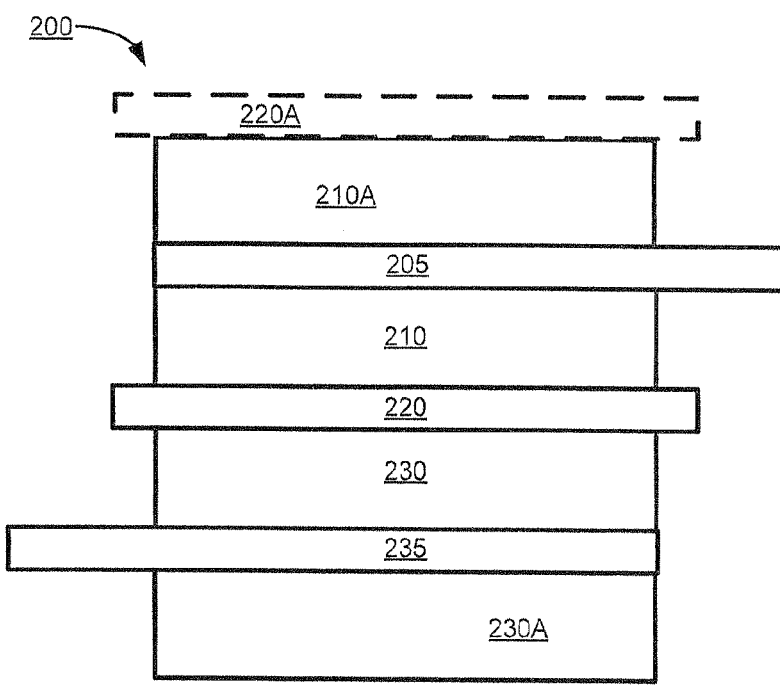

FIG. 2, including sub-part FIGS. 2A and 2B, illustrates, in a high level manner, respective cross-sectional views of an electrode assembly 200 which may be used in an ultracapacitor or a double layer capacitor. In FIG. 2A, the components of the assembly 200 are arranged in the following order: a first current collector 205, a first active electrode film 210, a porous separator 220, a second active electrode film 230, and a second current collector 235. In some implementations, a conductive adhesive layer (not shown) may be disposed on current collector 205 prior to bonding of the electrode film 210 (or likewise on collector 235 relative to film 230). In FIG. 2B, a double layer of films 210 and 210A are shown relative to collector 205, and a double layer 230, 230A relative to collector 235. In this way, a double-layer capacitor may be formed, i.e., with each current collector having a carbon film attached to both sides. A further porous separator 220A may then also be included, particularly for a jellyroll application, the porous separator 220A either attached to or otherwise disposed adjacent the top film 210A, as shown, or to or adjacent the bottom film 230A (not shown). The films 210 and 230 (and 210A and 230A, if used) may be made using particles of active electrode material obtained through the process 100 described in relation to FIG. 1. An exemplary double layer capacitor using the electrode assembly 200 may further include an electrolyte and a container, for example, a sealed can, that holds the electrolyte. The assembly 200 may be disposed within the container (can) and immersed in the electrolyte. In many implementations, the current collectors 205 and 235 may be made from aluminum foil, the porous separator 220 may be made from one or more ceramics, paper, polymers, polymer fibers, glass fibers, and the electrolytic solution may include in some examples, 1.5 M tetramethylammonium tetrafluoroborate in organic solutions, such as PC or Acetronitrile solvent. Alternative electrolyte examples are set forth below.

Following are several non-limiting examples of aqueous electrolytes which may be used in double-layer capacitors or ultracapacitors hereof: 1-molar Sodium sulphate, $Na_2SO_4$; 1-molar Sodium perchlorate, $NaClO_4$; 1-molar Potassium hydroxide, KOH; 1-molar Potassium chloride, KCl; 1-molar Perchloric acid, $HClO_4$; 1-molar Sulfuric acid, $H_2SO_4$; 1-molar Magnesium chloride, $MgCl_2$; and, Mixed aqueous 1-molar $MgCl_2/H_2O$/Ethanol. Some non-limitative nonaqueous aprotic electrolyte solvents which can be used in capacitors include: Acetonitrile; Gamma-butyrolactone; Dimethoxyethane; N,N,-Dimethylformamide; Hexamethyl-phosphorotriamide; Propylene carbonate; Dimethyl carbonate; Tetrahydrofuran; 2-methyltetra-hydrofuran; Dimethyl sulfoxide; Dimethyl sulfite; Sulfolane (tetra-methylenesulfone); Nitromethane; and, Dioxolane. Further, some non-limiting examples of electrolyte salts which can be used in the aprotic solvents include: Tetraalkylammonium salts (such as: Tetraethylammonium tetrafluoroborate, $(C_2H_5)_4NBF_4$; Methyltriethylammonium tetrafluoroborate, $(C_2H_5)_3CH_3NBF_4$; Tetrabutylammonium tetrafluoroborate, $(C_4H_9)_4NBF_4$; and, Tetraethylammonium hexafluorophosphate $(C_2H_5)NPF_6$); Tetraalkylphosphonium salts (such as: Tetraethylphosphonium tetrafluoroborate $(C_2H_5)_4PBF_4$; Tetrapropylphosphonium tetrafluoroborate $(C_3H_7)_4PBF_4$; Tetrabutylphosphonium tetrafluoroborate $(C_4H_9)_4PBF_4$; Tetrahexylphosphonium tetrafluoroborate $(C_6H_{13})_4PBF_4$; Tetraethylphosphonium hexafluorophosphate $(C_2H_5)_4PPF_6$; and, Tetraethylphosphonium trifluoromethylsulfonate $(C_2H_5)_4PCF_3SO_3$; and Lithium salts (such as: Lithium tetrafluoroborate $LiBF_4$; Lithium hexafluorophosphate $LiPF_6$; Lithium trifluoromethylsulfonate $LiCF_3SO_3$). Additionally, some Solvent free ionic liquids which may be used include: 1-ethyl-3-methylimidazolium bis(pentafluoroethylsulfonyl) imide EMIMBeTi; 1-ethyl-3-methylimidazolium bis(trifluoromethylsulfonyl imide EMIMIm; EMIIm; EMIBeti; EMIMethide; DMPIIm; DMPIBeti; DMPIMethide; BMIIm; BMIBeti; BMIMethide; PMPIm; and, BMPIm. Examples for use as Anions include: bis(trifluoromethylsulfonyl)imide $(CF_3SO_2)_2N^-$; bis(perfluoroethylsulfonyl)imide $(C_2F_5SO_2)_2N^-$; and, tris(trifluoromethylsulfonyl)methide $(CF_3SO_2)_3C^-$. And, examples for use as Cations include: EMI: 1-ethyl-3-methylimidazolium; DMPI: 1,2-dimethyl-3-propylimidazolium; BMI: 1-butyl-3-methylimidazolium; PMP: 1-N-propyl-3-methylpyridinium; and, BMP: 1-N-butyl-3-methylpyridinium.

Electrode products that include an active electrode film attached to a current collector and/or a porous separator may be used in an ultracapacitor or a double layer capacitor and/or other electrical energy storage devices.

In some implementations using a process 100, wherein activated carbon with between about 70 and 98 percent microporous activated carbon particles and between about 2 and 30 percent mesoporous activated carbon particles by weight or in some cases between about 80 and 98 percent microporous activated carbon particles and between about 2 and 20 percent mesoporous activated carbon particles by weight or even between about 85 and 95 percent microporous activated carbon particles and between about 5 and 15 percent mesoporous activated carbon particles by weight is used, a high performance ultracapacitor or double-layer capacitor product can be provided. Such a product further may include about 10 percent by weight binder, and about 0.5 percent by weight conductive particles, such as conductive carbon.

The inventive methods for making active electrode material, films of these materials, electrodes made with the films, and double layer capacitors employing the electrodes have been described above in considerable detail. This was done for illustrative purposes. Neither the specific implementations of the invention as a whole, nor those of its features, limit the general principles underlying the invention. In particular, the invention is not necessarily limited to the specific constituent materials and proportions of constituent materials used in making the electrodes. The invention is also not necessarily limited to electrodes used in double layer capacitors, but extends to other electrode applications. The specific features described herein may be used in some implementations, but not in others, without departure from the spirit and scope of the invention as set forth. Many additional modifications are intended in the foregoing disclosure, and it will be appreciated by those of ordinary skill in the art that, in some instances, some features of the invention will be employed in the absence of other features. The illustrative examples therefore do not define the metes and bounds of the invention and the legal protection afforded the invention, which function is served by the claims and their equivalents.

What is claimed is:

1. An electrode for an energy storage device comprising:
   a current collector; and
   a film of active electrode material attached to the current collector, wherein the active electrode material comprises a total amount of activated carbon having between about 70 and 98 percent microporous activated carbon particles of the total amount of activated carbon by weight and between about 2 and 30 percent mesoporous activated carbon particles of the total amount of activated carbon by weight.

2. The electrode of claim 1, wherein the total amount of activated carbon has between about 80 and 98 percent microporous activated carbon particles of the total amount of activated carbon by weight and between about 2 and 20 percent mesoporous activated carbon particles of the total amount of activated carbon by weight.

3. The electrode of claim 1, wherein the active electrode material includes activated carbon and a binder, wherein the total amount of activated carbon is in an amount of between about 80 and about 97 percent of the film by weight, and wherein the binder is in an amount of between about 3 and about 20 percent of the film by weight.

4. The electrode of claim 1, wherein the active electrode material comprises a mixture of activated carbon and binder.

5. The electrode of claim 1, wherein the film further comprises conductive particles.

6. The electrode of claim 5, wherein the film of active electrode material is less than about 15 percent conductive particles by weight.

7. The electrode of claim 6, wherein the film of active electrode material does not exceed about 0.5 percent conductive particles by weight.

8. The electrode of claim 5, wherein the conductive particles comprise conductive carbon.

9. The electrode of claim 8, wherein the conductive carbon comprises graphite.

10. The electrode of claim 1, wherein the active electrode material comprises a dry mixture of dry carbon and dry binder, and is free from processing solvent residue and additional binders.

11. The electrode of claim 10, wherein the binder comprises an inert binder.

12. The electrode of claim 11, wherein the film of active electrode material is between about 3 and about 20 percent binder by weight.

13. The electrode of claim 12, wherein the film of active electrode material is between about 9 and about 11 percent binder by weight.

14. The electrode of claim 11, wherein the binder comprises polytetrafluoroethylene (PTFE) particles.

15. The electrode of claim 14, wherein the PTFE particles have a diameter in the range of approximately 500 microns.

16. The electrode of claim 1, wherein the electrode is a capacitor electrode.

17. The electrode of claim 16, wherein the electrode is a double-layer capacitor electrode.

18. The electrode of claim 1, wherein the electrode is a fuel cell electrode.

19. The electrode of claim 1, wherein the electrode is a battery electrode.

20. The electrode of claim 1, wherein the current collector comprises an electrically conductive substrate.

21. The electrode of claim 20, wherein the current collector comprises a continuous metal foil, metal mesh, or nonwoven metal fabric.

22. The electrode of claim 2, wherein the total amount of activated carbon has between about 85 and 95 percent microporous activated carbon particles of the total amount of activated carbon by weight and between about 5 and 15 percent mesoporous activated carbon particles of the total amount of activated carbon by weight.

23. An energy storage device comprising an electrode, wherein the electrode comprises:
    a current collector; and
    a dry film of active electrode material attached to the current collector, comprising:
        70 and 98 percent by weight of microporous activated carbon particles of the total amount of activated carbon;
        2 and 30 percent by weight of mesoporous activated carbon particles of the total amount of activated carbon; and
        a dry binder.

24. The energy storage device of claim 23, wherein the binder comprises PTFE.

25. The energy storage device of claim 23, wherein the film is free from processing solvent residue.

26. The energy storage device of claim 23, wherein the energy storage device is a capacitor.

27. The energy storage device of claim 23, wherein the energy storage device is a battery.

* * * * *